(12) United States Patent
Prentiss

(10) Patent No.: X8231
(45) Date of Patent: Jun. 3, 1834

(54) COOKING STOVE

(76) Inventor: George Prentiss

George I Prentiss of Smithfield Rhode Island
Letters Patent

The Schedule referred to in these Letters Patent, and making part of
the same, containing a description in the words of the said George I Prentiss
himself of his improvement in the construction of Cooking Stoves
to burn anthracite Coal with a circular revolving oven.

To all to whom these presents shall come. Be it known that
I George I Prentiss of Smithfield in the County of Providence and
State of Rhode Island, and Providence Plantations have invented
a new and useful improvement in the Construction of [illegible] Cooking
Stoves to burn anthracite coal with a circular revolving oven. call
ed Prentiss' Cooking Stove "with a circular revolving oven"
and the following is a full and exact description of the construction
and operation of the said Stove as invented or improved by me, to
wit. — This improvement in the construction and formation of
this Stove consists in the circular revolving oven made of cast iron
resting on the centre, at one end and on two wheels at the other end,
It may also be made of sheet iron. and cased with a lining of tile,
or fire brick which will retain a sufficient quantity of heat to bake
bread, or other articles after all the fire is taken out of the stove
The exterior part of the oven when over heated is turned by means of
a crank. so that the heat may be applied when necessary, to its
cooler parts, and by means of a damper when the heat is too great it
may be excluded or applied as heat may be required. For the purpose
of boiling extra quantities of water a small cast iron cylinder is inser
ted in the side of the Stove, with a screw at the end to be inserted in
the vessel containing the water. To heat flatirons an iron plate is inserted
re fitted to go into the mouth of stove on the top of the oval.
In testimony that the above is a true specification of my said improvemen
I have hereunto set my hand seal this twenty second day of May in the year of our
Lord one thousand Eight hundred and thirty four George I Prentiss Witness { Edmund Bayley
(L.S.) { Oren Lawrence